(12) United States Patent
DeMars

(10) Patent No.: US 6,954,460 B2
(45) Date of Patent: Oct. 11, 2005

(54) METHOD AND APPARATUS FOR COMPRESSING PACKET HEADERS

(75) Inventor: Alan DeMars, Santa Maria, CA (US)

(73) Assignee: Ericsson Inc., Plano, TX (US)

( * ) Notice: Subject to any disclaimer, the term of this patent is extended or adjusted under 35 U.S.C. 154(b) by 712 days.

(21) Appl. No.: 09/972,270

(22) Filed: Oct. 5, 2001

(65) Prior Publication Data

US 2003/0067918 A1 Apr. 10, 2003

(51) Int. Cl.$^7$ .............................................. H04L 12/56
(52) U.S. Cl. ...................................... 370/392; 370/474
(58) Field of Search ................................. 370/389, 392, 370/395.1, 395.52, 458, 469, 471, 474

(56) References Cited

U.S. PATENT DOCUMENTS

| | | | |
|---|---|---|---|
| 5,987,022 A | 11/1999 | Geiger et al. ................ | 370/349 |
| 5,999,936 A | 12/1999 | Pattison et al. ............. | 707/101 |
| 6,032,197 A | 2/2000 | Birdwell et al. ............ | 709/247 |
| 6,041,054 A | 3/2000 | Westberg ..................... | 370/389 |
| 6,081,522 A | 6/2000 | Hendel et al. .............. | 370/389 |
| 6,088,356 A | 7/2000 | Hendel et al. .............. | 370/389 |
| 6,208,651 B1 | 3/2001 | Van Renesse et al. ...... | 370/392 |
| 6,608,841 B1 * | 8/2003 | Koodli ......................... | 370/474 |
| 6,700,888 B1 * | 3/2004 | Jonsson et al. ............. | 370/392 |
| 6,707,819 B1 * | 3/2004 | Fraser et al. ............. | 370/395.1 |
| 6,788,707 B1 * | 9/2004 | Horton et al. ............... | 370/474 |

FOREIGN PATENT DOCUMENTS

| | | |
|---|---|---|
| EP | 1 137 237 A | 9/2001 |
| WO | WO 01 35598 A | 5/2001 |
| WO | WO 01 50705 A | 7/2001 |

OTHER PUBLICATIONS

Aweya J: "On the design of IP routers Part 1: Router architectures" Journal of Systems Architecture, Elsevier Science Publishers BV., Amsterdam, NL, vol. 46, No. 6, Apr. 2000, pp. 483–511, XP004190486 ISSN: 1383–7621 p. 490, right–hand column, line 1—p. 494, left–hand column, line 20 and p. 502, left–hand column, line 16—p. 506, left–hand column, line 36.

Hoshi T et al: "Voice Stream Multiplexing Between IP Telephony Gateways" IEICE Transactions on Information and Systems, Institute of Electronics Information and Comm. Eng. Tokyo, JP vol. E82–D, No. 4 Apr. 1999, pp. 838–845, XP000832566 ISSN: 0916–8532 abstract section 2–section 4 figures 1–13.

Kempainen S: "CTI Converges on a Single TDM Bus" EDN Electrical Design News, Cahners Publishing Co. Newton, Massachusetts, US vo. 42, No. 24, Nov. 20, 1997, pp. 55–56, 58, 60, 62, XP000767137 ISSN: 0012–7515 abstract p. 62, left–hand column, line 51—p. 68, right–hand column, line 11.

* cited by examiner

Primary Examiner—Man U. Phan
Assistant Examiner—Toan Nguyen

(57) ABSTRACT

The present invention provides a method and apparatus for creating a packet having one or more compressed headers. Call set-up information is received. Thereafter, call data is received and a data portion of the packet is created using the call data. One or more current headers are created using the call data and the call set-up information. The one or more current headers are compressed. The packet is then created by attaching the one or more compressed headers to the data portion of the packet. The one or more compressed headers are created using one or more differences between the one or more current headers and the one or more previous headers. After compression, the one or more current headers are saved as the one or more previous headers.

23 Claims, 10 Drawing Sheets

METHOD AND APPARATUS FOR COMPRESSING PACKET HEADERS

TECHNICAL FIELD OF THE INVENTION

The present invention relates generally to the field of communications and, more particularly, to a method and apparatus for compressing packet headers.

BACKGROUND OF THE INVENTION

The increasing demand for data communications has fostered the development of techniques that provide more cost-effective and efficient means of using communication networks to handle more information and new types of information. One such technique is to segment the information, which may be a voice or data communication, into packets. A packet is typically a group of binary digits, including at least data and control information. Integrated packet networks (typically fast packet networks) are generally used to carry at least two (2) classes of traffic, which may include, for example, continuous bit-rate ("CBR"), speech ("Packet Voice"), data ("Framed Data"), image, and so forth. Packet networks source, sink and/or forward protocol packets. Each packet has a well-defined format and consists of one or more packet headers and some data. The header typically contains information that gives control and/or address information, such as the source and destination of the packet.

The creation and transport of packet headers typically requires a significant amount of system resources, such as a central processing unit ("CPU") and/or a router. Such processing constraints cause congestion and Quality of Service ("QoS") problems inside the switch. In addition, the throughput performance of the switch is dominated primarily by the forwarding of packet headers rather than the call data. Accordingly, there is a need for a method and apparatus for compressing the packet headers to increase the throughput of the switch.

SUMMARY OF THE INVENTION

The present invention provides a method and apparatus for compressing packet headers to increase the throughput of a switch. As a result, the present invention reduces congestion, increases QoS, increases throughput and contributes to the overall system efficiency.

The present invention provides a method of creating a packet having one or more compressed headers. Call set-up information is received. Thereafter, call data is received and a data portion of the packet is created using the call data. One or more current headers are created using the call data and the call set-up information. The one or more current headers are compressed and attached to the data portion of the packet to create the packet. In addition, the one or more headers may include a real time transport protocol header, a user datagram protocol header, an Internet protocol header, and a media access control header.

In addition, the present invention provides an apparatus containing an array of digital signal processors. Each digital signal processor is programmed to receive call set-up information, receive call data, create a data portion of the packet using the call data, create one or more current headers using the call data and the call set-up information, compress the one or more current headers and create a packet by attaching the one or more compressed headers to the data portion of the packet.

The present invention also provides a communications switch having one or more cards having ingress, signal processing and egress functions, one or more control cards containing one or more processors, a switch fabric communicably coupling the one or more cards and the control cards, and a TDM bus communicably coupling the one or more cards and the control cards. The signal processing function of the one or more cards comprises one or more arrays of digital signal processors. Each digital signal processor is programmed to receive call set-up information, receive call data, create a data portion of the packet using the call data, generate one or more current headers using the call data and the call set-up information, compress the one or more current headers and create a packet by attaching the one or more compressed headers to the data portion of the packet. The one or more egress cards are programmed to decompress the one or more compressed headers.

In the method, apparatus and system described above, the one or more current headers are compressed using the following steps. Whenever the one or more previous headers have not been saved, the one or more current headers are saved as the one or more previous headers and the one or more current headers are used as one or more compressed headers. Whenever the one or more previous headers have been saved, the one or more compressed headers are created using one or more differences between the one or more current headers and the one or more previous headers and the one or more current headers are saved as the one or more previous headers. The one or more compressed headers are decompressed using the following steps. Whenever one or more previous headers have not been saved, the one or more compressed headers are saved as the one or more previous headers and the one or more compressed headers are used as one or more decompressed headers. Whenever the one or more previous headers have been saved, the one or more decompressed headers are created using one or more differences between the one or more compressed headers and the one or more previous headers, and the one or more decompressed headers are saved as the one or more previous headers.

Alternatively, the one or more current headers are compressed using the following steps. Whenever one or more previous headers have not been saved, the one or more current headers are saved as the one or more previous headers and one or more compressed headers are created to indicate no changes. Whenever the one or more previous headers have been saved, the one or more compressed headers are created using one or more differences between the one or more current headers and the one or more previous headers, and the one or more current headers are saved as the one or more previous headers. In this case, the decompressing device, such as the egress card, receives the call set-up information, creates one or more current headers using the call data and the call set-up information and saves the one or more current headers. The one or more compressed headers are then decompressed by creating the one or more decompressed headers using one or more differences between the one or more compressed headers and the one or more previous headers and saving the one or more decompressed headers as the one or more previous headers.

Those skilled in the art will appreciate that the present invention is applicable not only to the compression/decompression of packet headers in the ingress to egress direction, but also to the compression/decompression of packet headers in the egress to ingress direction. Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a method and apparatus for creating a packet having one or more compressed headers. As a result, the present invention reduces congestion, increases QoS, increases throughput and contributes to the overall system efficiency.

Figure 1:
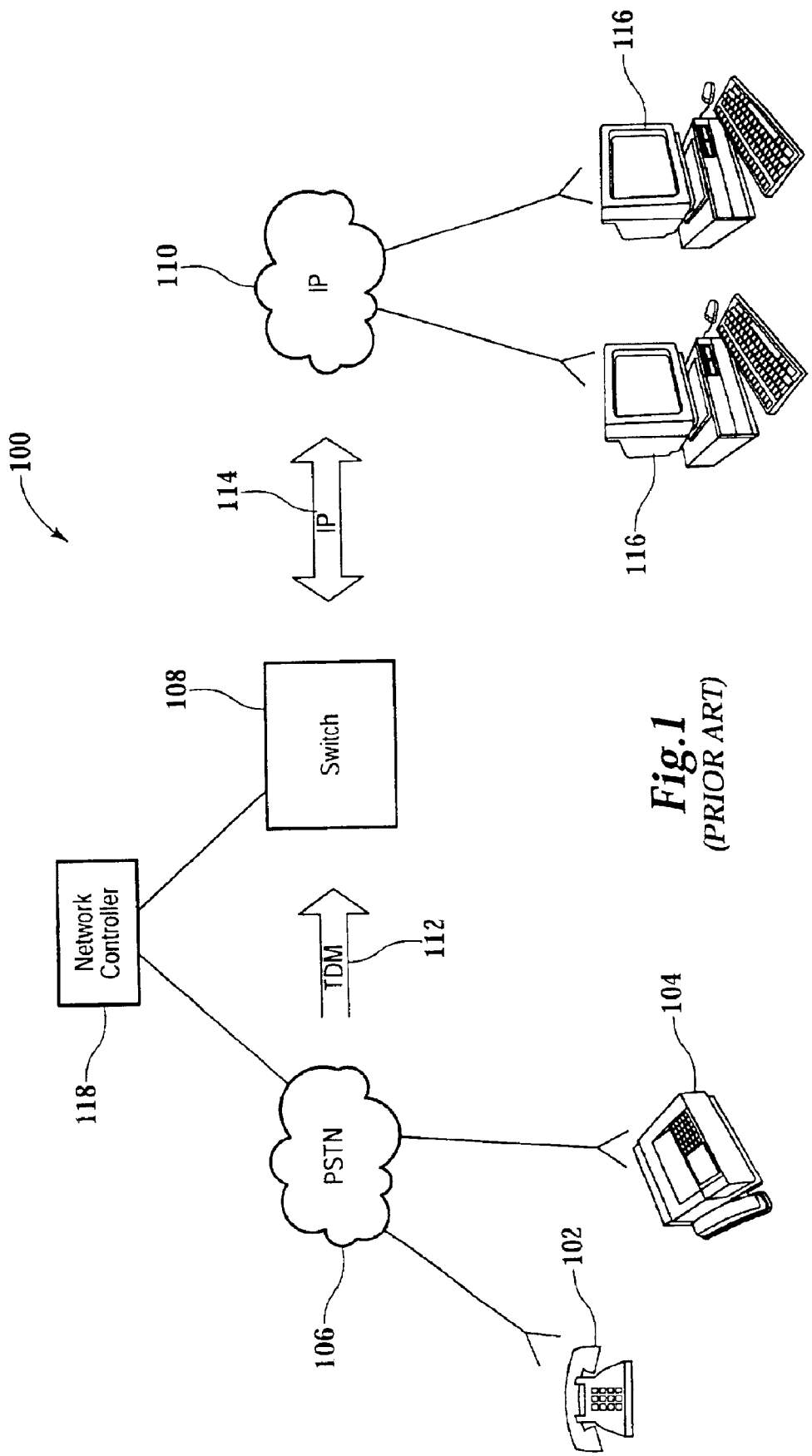
FIG. 1 is a block diagram of a representative integrated network in accordance with the prior art.

Now briefly referring to FIGS. 1–3, a representative network (FIG. 1) and various packet network switches and methods of header creation (FIGS. 2A, 2B, 3A and 3B) will be described in accordance with the prior art. FIG. 1 depicts a representative integrated network 100 in which phones 102 and faxes 104 are communicably coupled to a public switched telephone network ("PSTN") 106. A switch 108 is communicably coupled to the PSTN 106 and an Internet Protocol ("IP") network 110 to convert time division multiplexing ("TDM") based communications 112 to IP-based communications 114. The switch 108 creates IP packets containing the necessary destination information so that the packets 114 can be properly routed to their destinations, which may include computers 116 or other devices communicably coupled to the IP network 110. A network controller 118 is communicably coupled to the PSTN 106 and the switch 108, and provides control signals to the switch 108 for proper processing of the TDM based communications 112. The network controller 118 may also be communicably connected to the IP network 110. Network controller 118 can function as a Media Gateway Control ("MGC"). The MGC protocol is one of a few proposed control and signal standards to compete with the older H.323 standard for the conversion of audio signals carried on telephone circuits, such as PSTN 106 to data packets carried over the Internet or other packet networks, such as IP network 110. As will be appreciated by those skilled in the art, the present invention is not limited to the conversion of TDM based communications to IP-based communications; instead, the present invention may be applied to any conversion of a multiplexed communication to a packet-based communication.

IP specifies the format of packets, also called datagrams, and the addressing scheme. Most networks combine IP with a higher-level protocol. One such protocol is the Transport Control Protocol ("TCP"), which establishes a virtual connection between a destination and a source. IP allows a packaged to be addressed and dropped in a system, but there is no direct link between the sender and the recipient. TCP/IP, on the other hand, establishes a connection between two hosts so that they can send messages back and forth for a period of time. IP network 110 receives and sends messages through switch 108, ultimately to phone 102 and/or fax 104. PCs 116 receive and send messages through IP network 110 in a packet-compatible format. Voice over IP ("VoIP") is the ability to make telephone calls and send faxes over IP-based data networks, such as IP network 110. An integrated voice/data network 100 allows more standardization and reduces total equipment needs. VoIP can support multimedia and multi-service applications.

Figure 2A:
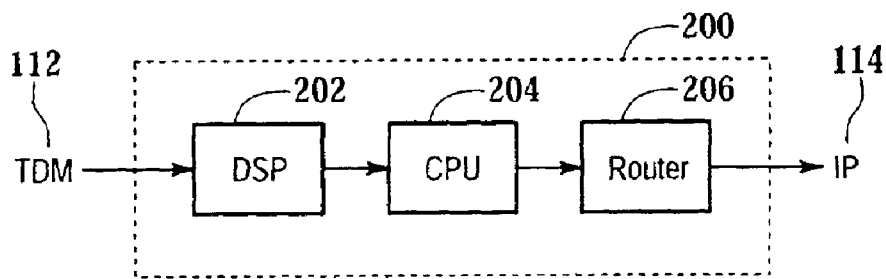
FIG. 2A is a schematic diagram of a packet network switch in accordance with the prior art.
Figure 2B:
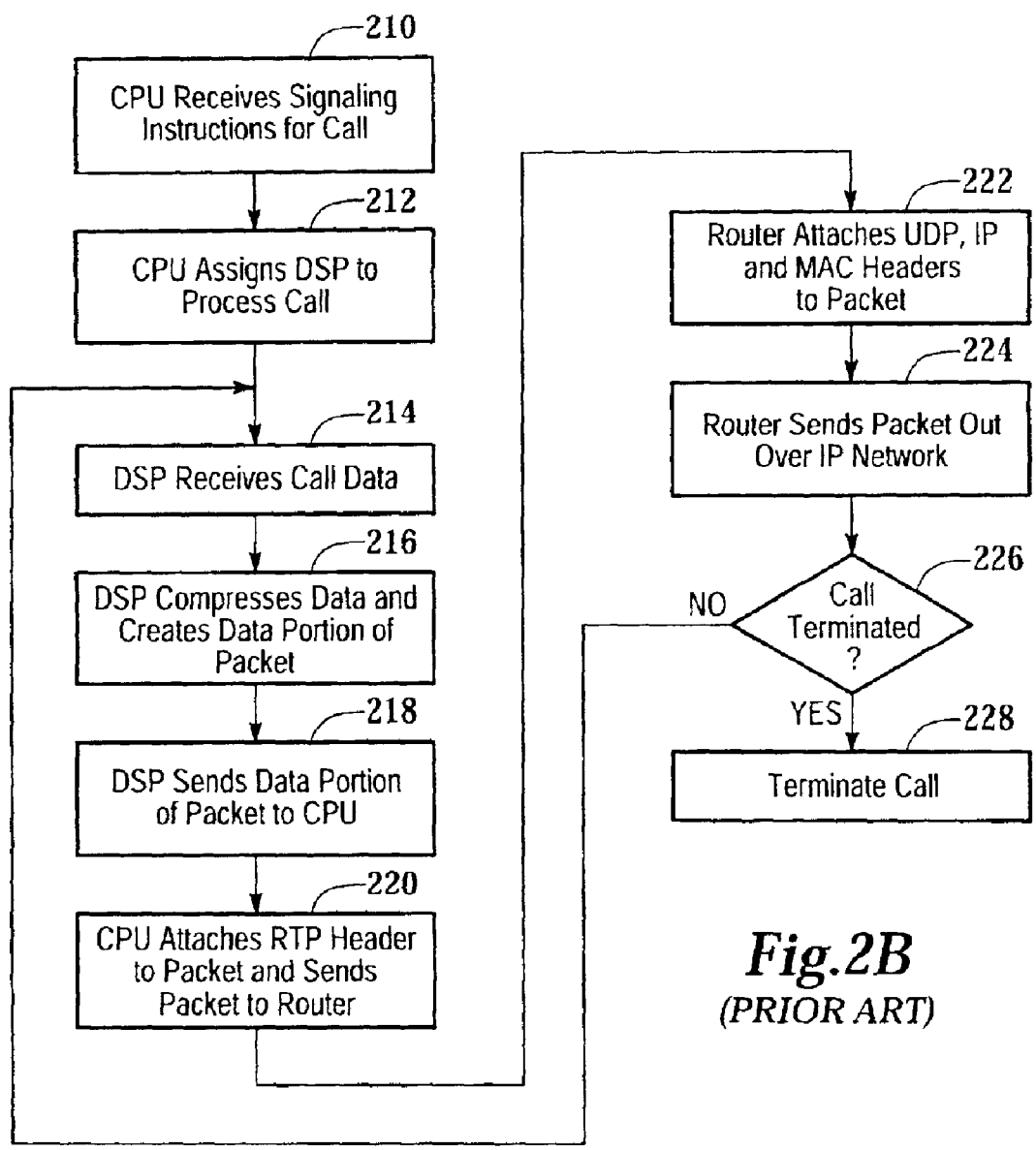
FIG. 2B is a flowchart of a header creation method in accordance with the voice gateway in FIG. 2A.

Turning now to FIGS. 2A and 2B, a schematic diagram of a packet network switch 200 and a header creation method in accordance with the prior art are shown. As illustrated, the packet network switch 200 includes a digital signal processor ("DSP") 202 communicably coupled to a CPU 204. The CPU 204 is communicably coupled to a router 206. During the conversion of a TDM-based communication 112 to an IP-based communication 114, the CPU 204 receives signaling instructions for the call in block 210 and assigns a DSP 202 to process the call in block 212. The DSP 202 receives the call data in block 214. The DSP 202 then compresses the call data and creates a data portion of the packet in block 216. The DSP 202 sends the data portion of the packet to the CPU 204 in block 218. The CPU 204 creates a real time transport protocol ("RTP") header, attaches the RTP header to the data portion of the packet and sends the packet to the router 206 in block 220. The router 206 creates a user datagram protocol ("UDP") header, internet protocol ("IP") header and media access control ("MAC") header and attaches these headers to the packet in block 222. The router 206 then sends the complete packet (data plus headers) out over the IP network in block 224. If the call is terminated, as determined in decision block 226, the call is terminated in block 228. If, however, the call is not terminated, the DSP 202 receives more call data in block 214 and the above-described process repeats until the call is terminated. As illustrated, both the CPU 204 and the router 206 share the responsibility for header creation in the packet network switch 200.

Signaling instructions refers to the exchange of call control or call set-up information between the switch and other network elements. The purpose of a signaling system is to transfer control information, or signaling units, between elements in a telecommunications system. Early signaling systems carried the control signals on the same circuit as the user traffic. For example, older in-band signaling systems use this approach. Newer signaling systems, such as Common Channel Signaling System 7 ("SS7"), use a separate channel for signaling information. These systems are called common channel signaling systems because a separate (common) channel is used for signaling. Some call this approach "out of band" signaling. Two types of out-of-band signaling exist today. SS7 is an example of the first type, physical out-of-band signaling, in which a separate physical channel is used for signaling. SS7 is usually, but not necessarily, deployed as a separate network within the complete telephone network architecture for the purpose of establishing and terminating telephone calls. SS7 messages are exchanged between network elements over bidirectional channels called signaling links. ISDN is an example of physical in-band, logical out-of-band signaling. In this approach, signaling and user traffic share the same physical transmission medium, but part of the channel capacity is reserved only for signaling traffic. The remainder of the bandwidth is reserved for user traffic, such as the telephone call. Other signaling schemes can be used with T1 and E1 circuits.

RTP is an Internet standard for the transport of real time data, including audio and video. RTP is used to identify packets as containing a voice sampling in a particular encoding format. A timestamp and sequence number are typically used to reassemble a synchronous voice stream from a stream of RTP packets. RTP can also be used for media on demand services and interactive services like IP telephony. On the other hand, UDP provides efficient but unreliable (nonguaranteed) transport of data. It is used for the transport of real-time voice data since retransmission of real-time data would add too much delay to the voice conversation. IP, however, provides a standard encapsulation of data for transmission over the network. It contains a source and destination address used for routing. MAC performs management functions and handles address resolution protocol ("ARP") for the device.

Figure 3A:
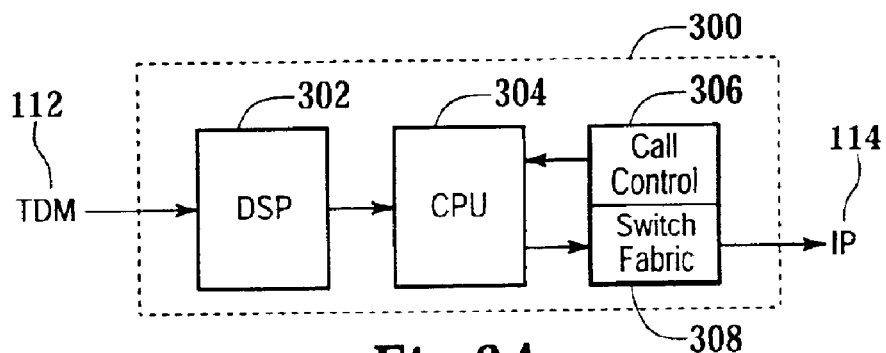
FIG. 3A is a schematic diagram of a packet network switch in accordance with the prior art.
Figure 3B:
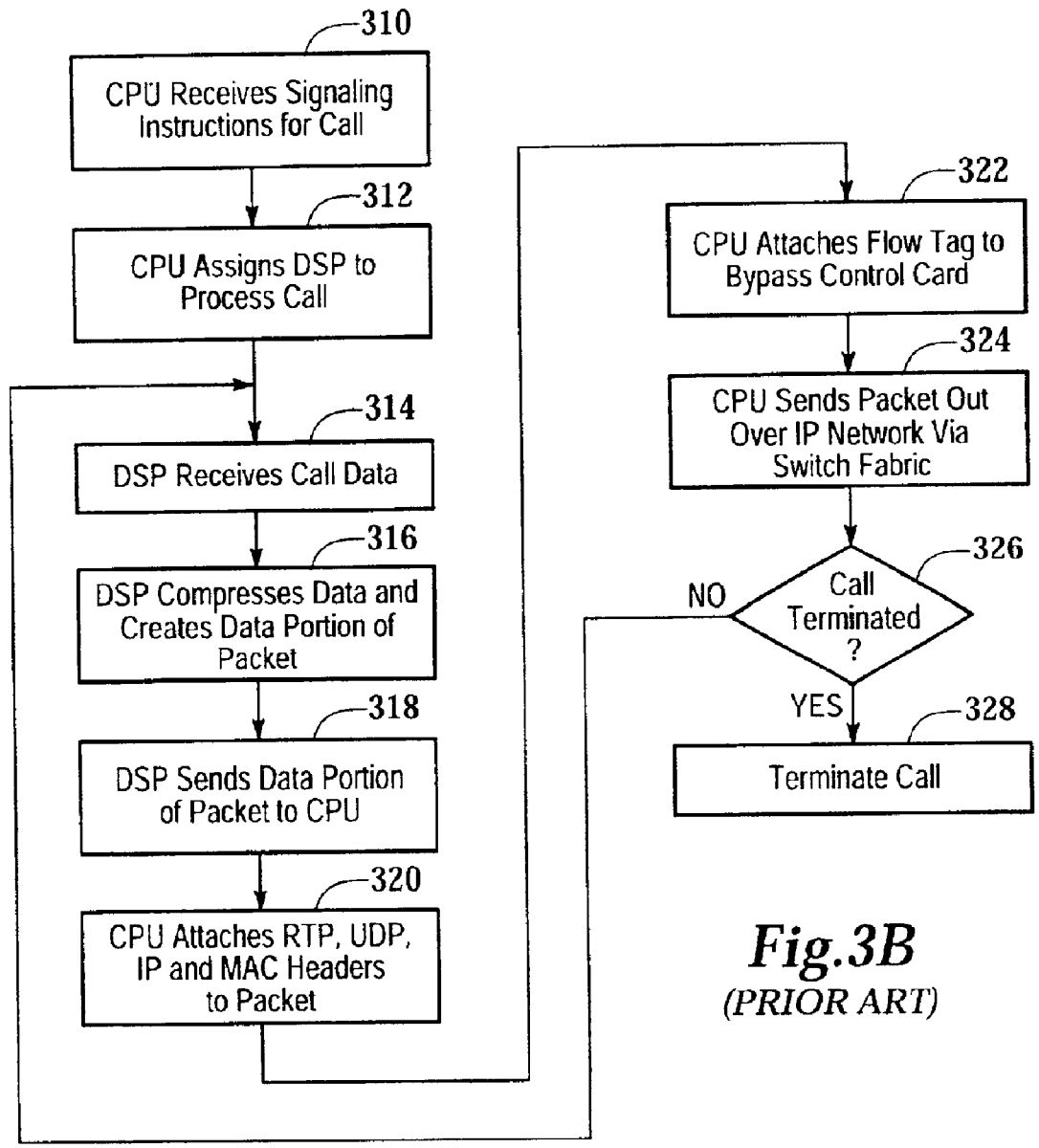
FIG. 3B is a flowchart of a header creation method in accordance with the voice gateway in FIG. 3B.

Turning now to FIGS. 3A and 3B, a schematic diagram of a packet network switch 300 and a header creation method in accordance with the prior art are shown. As illustrated, the packet network switch 300 includes a digital signal processor ("DSP") 302 communicably coupled to a CPU 304. The CPU 304 is communicably coupled to a call control card 306 and a switch fabric 308. During the conversion of a TDM-based communication 112 to an IP-based communication 114, the CPU 304 receives signaling instructions for the call from the call control card 306 in block 310 and assigns a DSP 302 to process the call in block 312. The DSP 302 receives the call data in block 314. The DSP 302 then compresses the call data and creates a data portion of the packet in block 316. The DSP 302 sends the data portion of the packet to the CPU 304 in block 318. The CPU 304 creates a RTP header, a UDP header, an IP header and a MAC header, and attaches these headers to the data portion of the packet in block 320. The CPU 304 then attaches a flow tag to the packets to bypass the call control card 306 in block 322. The CPU 304 sends the packet to switch fabric 308, which removes the flow tag and sends the complete packet (data plus headers) out over the IP network in block 324. If the call is terminated, as determined in decision block 326, the call is terminated in block 328. If, however, the call is not terminated, the DSP 302 receives more call data in block 314 and the above-described process repeats until the call is terminated. As illustrated, the CPU 304 has sole responsibility for header creation in the packet network switch 300.

Figure 4:
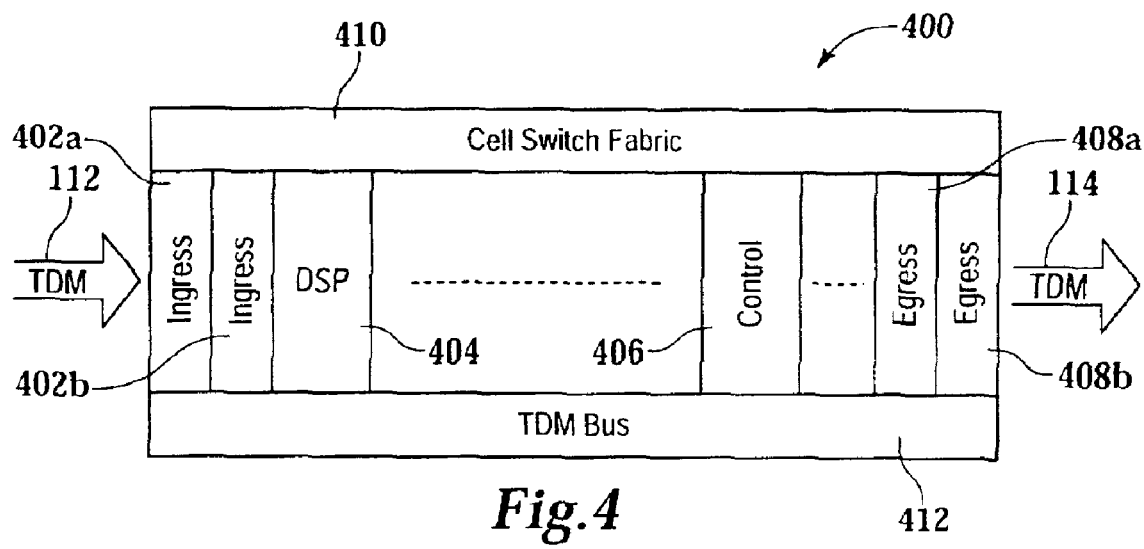
FIG. 4 is a diagram of a packet network switch in accordance with the present invention.

Now referring to the present invention and to FIG. 4, a packet network switch 400 will now be described. The packet network switch 400 can be used to process VoIP, voice over Frame Relay ("VoFR") and other types of calls. Moreover, the packet network switch 400 is similar to an asynchronous transfer mode ("ATM") switch. ATM is a connection-oriented technology used in both local area network ("LAN") and wide area network ("WAN") environments. It is a fast-packet switching technology that allows free allocation of capacity to each channel. Packet network switch 400 includes one or more ingress cards 402a and 402b, one or more signal processing cards 404, one or more control cards 406, one or more egress cards 408a and 408b, a switch fabric 410 and a TDM bus 412. Each signal processing card 404 contains an array of digital signal processors ("DSP") (not shown) and each control card 406 contains one or more processors (not shown). The switch fabric 410 communicably couples the ingress cards 402, the signal processing cards 404, the control cards 406 and the egress cards 408 together. The TDM bus 412 also communicably couples the ingress cards 402, the signal processing cards 404, the control cards 406 and the egress cards 408 together. Preferably cards 402, 404, 406 and 408 can be inserted in any order within packet network switch 400. Moreover, the packet network switch 400 should include sufficient numbers of redundant cards to serve as backup cards in the event a card 402, 404, 406 and 408 fails. Note that the ingress cards 402, signal processing cards 404, and the egress cards 408 can be replaced by one or more cards having ingress, signal processing and egress functions.

The main function of a packet network switch 400 is to relay user data cells from input ports to the appropriate output ports. When a call or communication is to be handled by the packet network switch 400, a network controller 118 (FIG. 1) provides the control card 408 with the necessary call set-up information. Control card 408 uses this call set-up information to assign a port in ingress cards 402a or 402b to receive the call from the PSTN 106 (FIG. 1), a DSP within processing card 404 to process the call, and a port in egress cards 408a or 408b to send the call to IP network 110 (FIG. 1). The TDM-based communications or messages 112 enter through ingress cards 402a or 402b and are routed to the appropriate processing card 404 through TDM Bus 412. The DSPs in processing card 404 convert messages between analog and digital information formats, and provide digital compression and switching functions. In one embodiment, each processing card 404 is capable of processing 1024 simultaneous sessions. The processing card 404 then sends the messages from the DSP to cell switch fabric 410, which is primarily responsible for the routing and transferring of messages or data cells, the basic transmission unit, between switch elements. The switch fabric 410 may also provide cell buffering, traffic concentration and multiplexing, redundancy for fault tolerance, multicasting or broadcasting, and cell scheduling based on delay priorities and congestion monitoring. Switch fabric 410 ultimately routes the messages to egress cards 408a or 408b. In one embodiment, each egress card 408 is capable of handling at least 8000 calls. Egress cards 408a and 408b typically send the messages to a gigabit Ethernet (not shown). As its name indicates, the gigabit Ethernet supports data rates of one (1) gigabit (1,000 megabits) per second.

Figure 5:
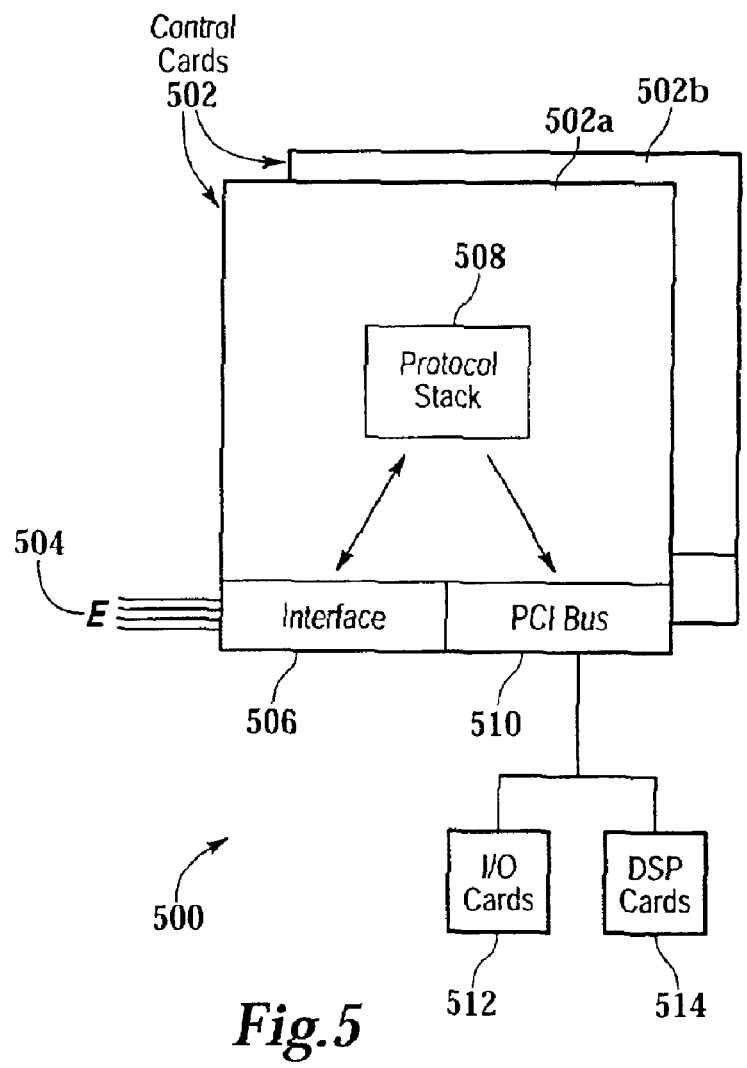
FIG. 5 is a schematic diagram illustrating a packet operating system in accordance with the present invention.

Turning now to FIG. 5, a schematic diagram illustrating a packet operating system 500 with redundant control cards 502a and 502b is shown. Control cards 502a and 502b are housed within a single chassis, such as switch 400 (FIG. 4). Messages 504 enter packet operating system 500 through interface 506 on control card 502a. Messages 504 travel from interface 506 onto protocol stack 508 and then to peripheral component interconnect ("PCI") bus 510. PCI bus 510 sends messages 504 to either input/output ("I/O") cards 512 or DSP cards 514. Control card 502b mirrors either a portion or all of the data of control card 502a. Each control card 502a and 502b of packet operating system 500 has its own memory and thus avoids the typical problems associated with shared memory, such as recursive calls and have synchronization and corruption problems.

Figure 6A:
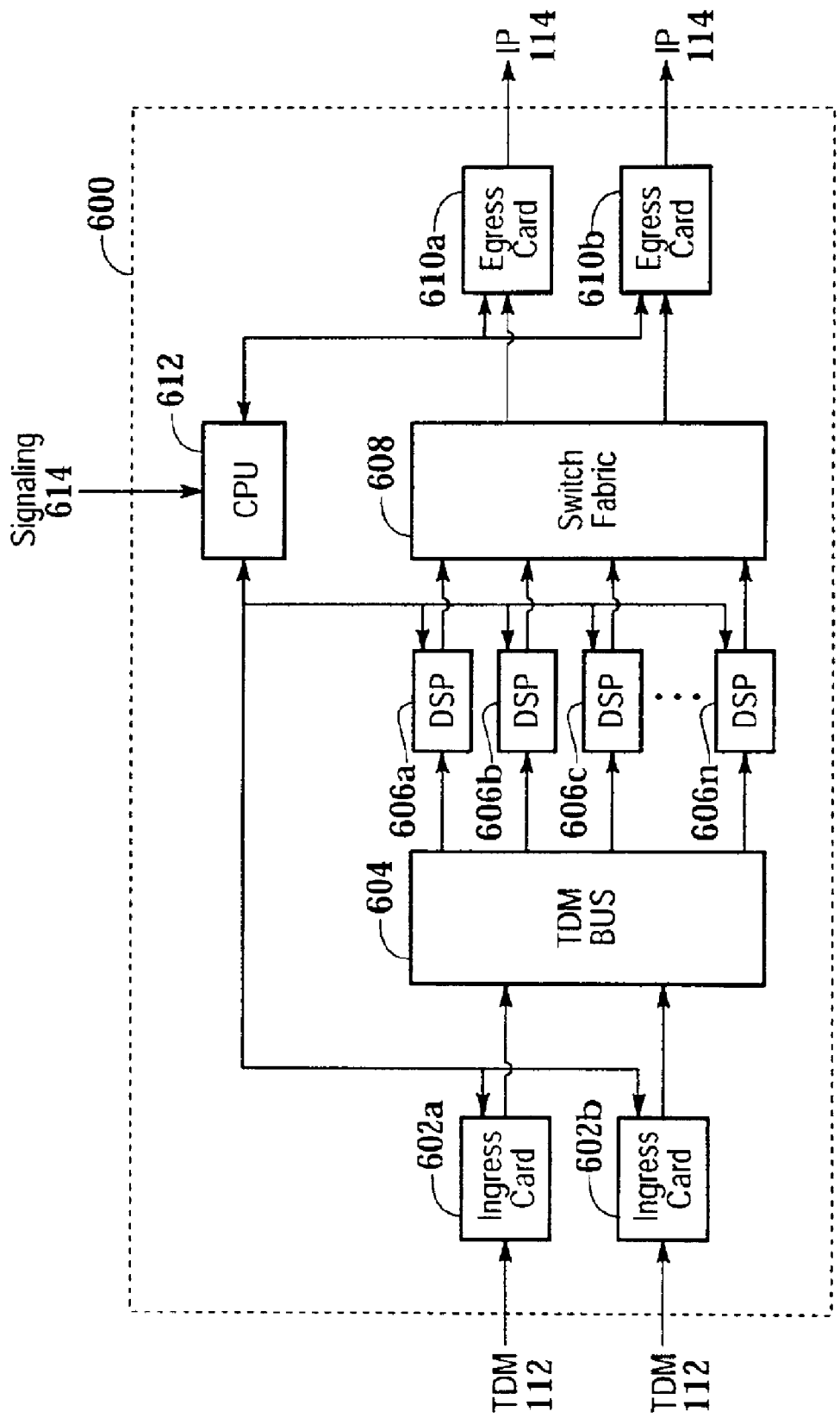
FIG. 6A is a schematic diagram of a packet network switch in accordance with the present invention.
Figure 6B:
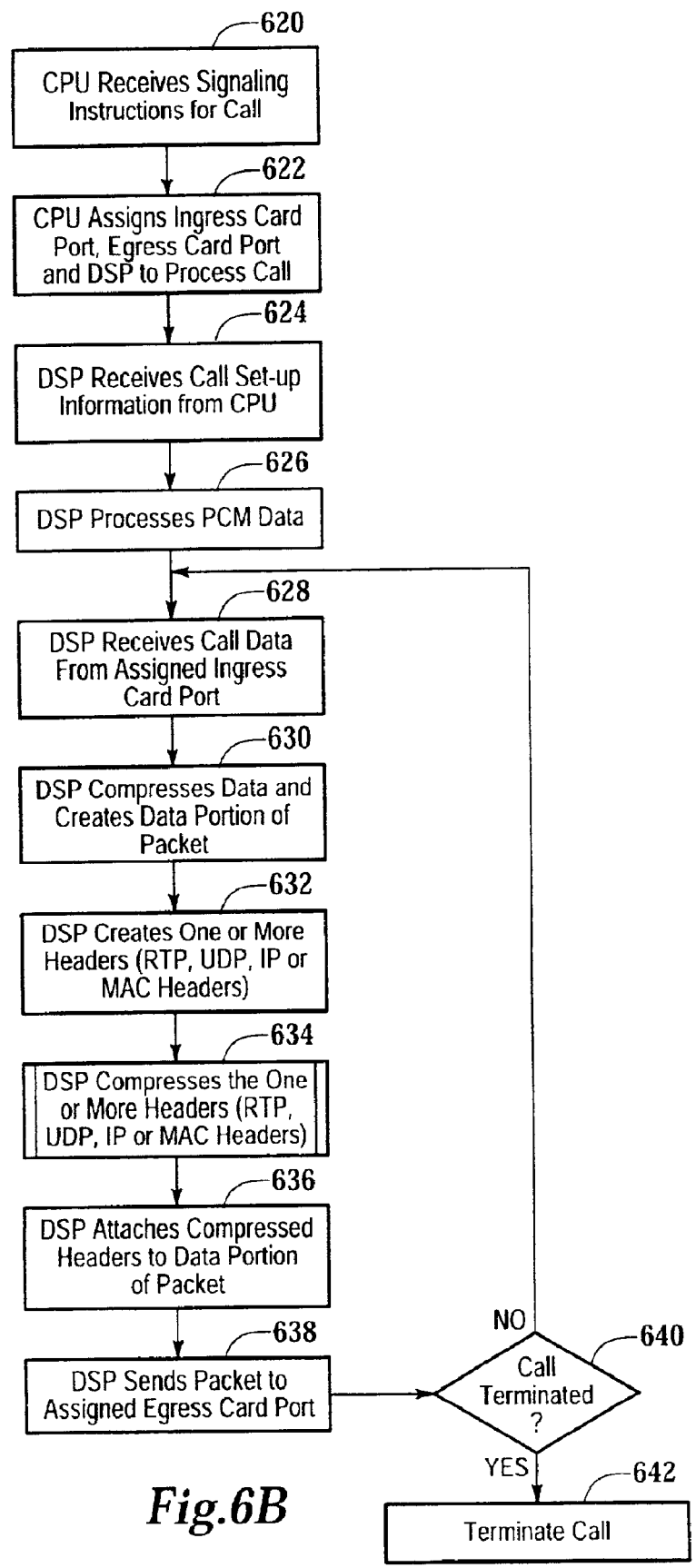
FIG. 6B is a flowchart of a header creation method in accordance with the present invention.

Referring now to FIGS. 6A and 6B, a schematic diagram of a packet network switch 600 and a header creation method in accordance with the present invention are shown. The packet network switch 600 includes ingress cards 602a and 602b communicably coupled to a TDM bus 604. The TDM bus 604 is communicably coupled to a number of DSPs 606a, 606b, 606c . . . 606n. The DSPs 606a, 606b, 606c . . . 606n are typically configured in an array of DSPs located on one or more signal processing cards 404 (FIG. 4). Each DSP 606a, 606b, 606c . . . 606n is communicably coupled to a switch fabric 608. The switch fabric is communicably coupled to egress cards 610a and 610b. Packet network switch 600 also includes one or more CPUs 612, which are typically located on one or more control cards 406 (FIG. 4). The CPU 612 is communicably coupled to the ingress cards 602a and 602b, the DSPs 606a, 606b, 606c . . . 606n, and the egress cards 610a and 610b. Note that the ingress cards 602a and 602b, the DSPs 606a, 606b, bx;1606c . . . 606n, and the egress cards 610a and 610b can be replaced by one or more cards having ingress, signal processing and egress functions.

During the conversion of a TDM-based communication 112 to an IP-based communication 114, the CPU 612 receives signaling instructions 614 for the call in block 620 and assigns an ingress card 602a, 602b port, and egress card 610a, 610b port, and a DSP 606a, 606b, 606c . . . 606n to process the call in block 622. The DSP 606a, 606b, 606c . . . 606n receives call set-up information from the CPU 612 in block 624. Various operating parameters are typically required to properly configure the DSP 606a, 606b, 606c . . . 606n to process a certain type of call. These parameters can be preset or loaded dynamically using an overlay mechanism. One or more overlays can be stored within the DSP 606a, 606b, 606c . . . 606n or within a separate memory location. For example, the DSP 606a, 606b, 606c . . . 606n can request an overlay from the CPU 612 based on the call set-up information or bearer type. The DSP 606a, 606b, 606c . . . 606n then receives and loads the overlay. After an overlay has been loaded, DSP 606a, 606b, 606c . . . 606n may perform further discrimination to determine whether a different overlay is required. If the overlay needs to be changed the DSP 606a, 606b, 606c . . . 606n requests a different overlay, and receives and loads the different over-lay. For example, the call set-up information may indicate that the bearer type of the call is voice even though the bearer type may actually be either voice or fax. Thus, if the DSP 606a, 606b, 606c . . . 606n recognizes through further discrimination of the PCM data that the call is actually a fax instead of a voice call, the DSP 606a, 606b, 606c . . . 606n will request a different overlay so as to properly configure the DSP 606a, 606b, 606c . . . 606n to process the fax.

Although not required by the present invention, the real-time loading of overlays allows each DSP 606a, 606b, 606c . . . 606n to process any call type. The use of overlays also allows the packet network switch 600 to be updated to process new call types or more efficiently process existing call types via software updates or downloads. In addition, the packet network switch 600 can use the allocation of overlays to dynamically control the allocation of bandwidth to the various call types to ensure QoS standards and/or compliance with licensing restrictions.

Next, the DSP 606a, 606b, 606c . . . 606n processes the pulse code modulated ("PCM") data in block 626. The DSP 606a, 606b, 606c . . . 606n receives the call data from the assigned ingress card 602a, 602b port via the TDM bus 604 in block 628. The DSP 606a, 606b, 606c . . . 606n then compresses the call data and creates a data portion of the packet in block 630. The DSP 606a, 606b, 606c . . . 606n may also create one or more digital samples from the compressed call data and create the data portion of the packet using the one or more digital samples. The DSP 606a, 606b, 606c . . . 606n also creates one or more headers, such as a RTP header, a UDP header, an IP header and a MAC header, using the call data and the call set-up information in block 632. More specifically, the RTP and UDP headers are determined by the call data while the IP and MAC headers are generated from the call set-up information. Note that the DSP 606a, 606b, 606c . . . 606n is not limited to the creation of any specific headers, such as a RTP header, a UDP header, an IP header or a MAC header, but can be used to create any header necessary for proper delivery of a packet.

The DSP 606a, 606b, 606c . . . 606n then compresses the one or more headers in block 634, which will be described in more detail in reference to FIGS. 6C and 7A. The DSP 606a, 606b, 606c . . . 606n then attaches the one or more compressed headers to the data portion of the packet in block 636. The DSP 606a, 606b, 606c . . . 606n sends the complete packet (data plus compressed headers) to the assigned egress card 610a, 610b port via the switch fabric 608 for transmission out over the IP network in block 638. If the call is terminated, as determined in decision block 640, the call is terminated in block 642. If, however, the call is not terminated, the DSP 606a, 606b, 606c . . . 606n receives more call data in block 628 and the above-described process repeats until the call is terminated. As illustrated, the DSP 606a, 606b, 606c . . . 606n has sole responsibility for header creation in the packet network switch 600. As a result, system resources are conserved because the CPU 612 is relieved from the responsibility of header creation. Moreover, the responsibility of header creation is distributed over a number of DSPs 606a, 606b, 606c . . . 606n. The CPU 612 is, therefore, free to accomplish other tasks, which necessarily reduces congestion, increases QoS, increases throughput and contributes to the overall system efficiency.

Figure 6C:
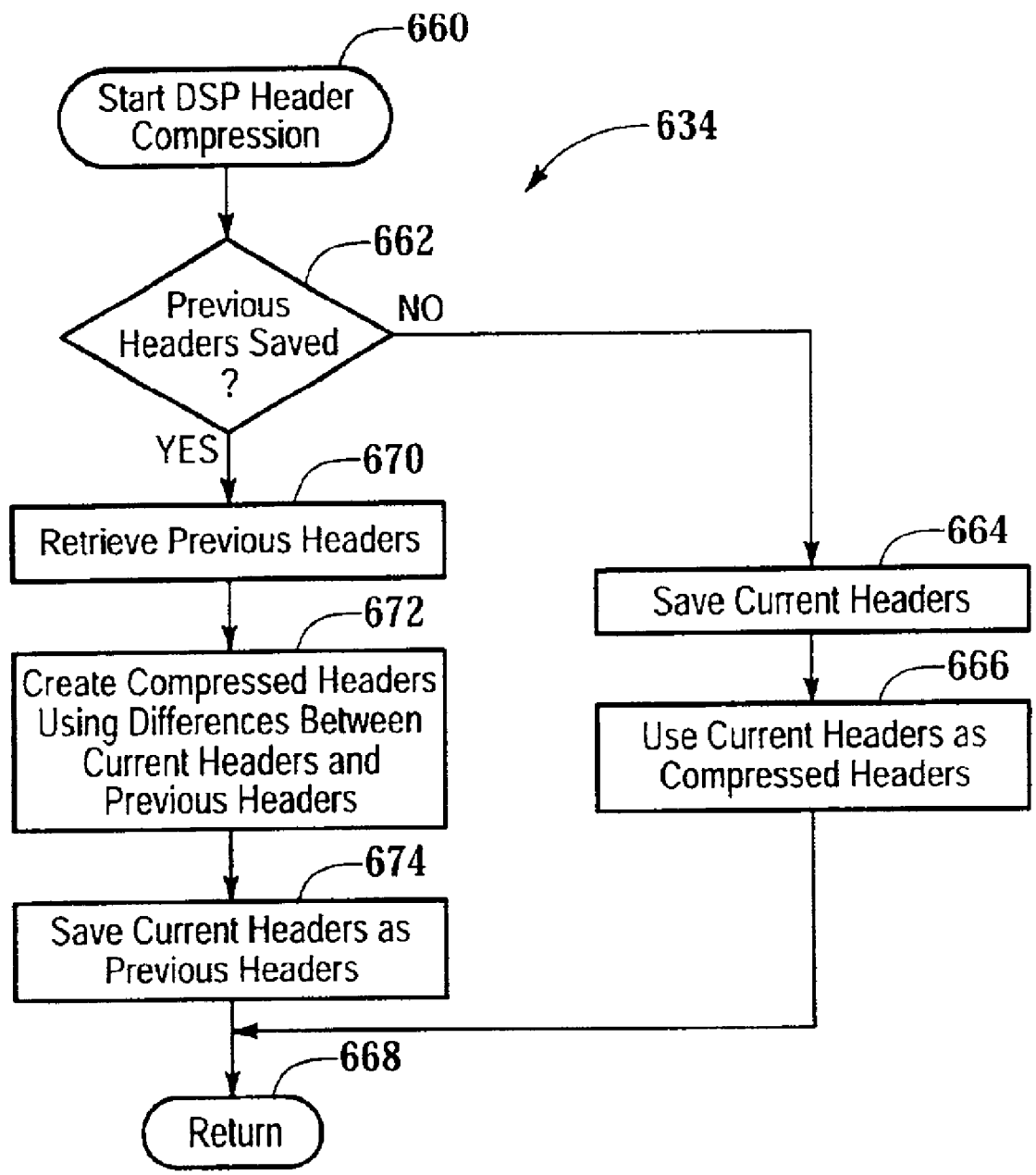
FIG. 6C is a flowchart of a header compression method in accordance with one embodiment of the present invention.

Now referring to FIG. 6C, a flowchart depicting one embodiment of the compression process of block 634 is shown. The DSP header compression process 634 begins in block 660. Whenever one or more previous headers have not been saved, as determined in decision block 662, the one or more current headers are saved as the one or more previous headers in block 664, the one or more current headers are used as the one or more compressed headers in block 666 and the process returns in block 668. If, however, the one or more previous headers have been saved, as determined in decision block 662, the one or more previous headers are retrieved in block 670, the one or more compressed headers are created using one or more differences between the one or more current headers and the one or more previous headers in block 672, the one or more current headers are saved as the one or more previous headers in block 674 and the process returns in block 668.

Figure 6D:
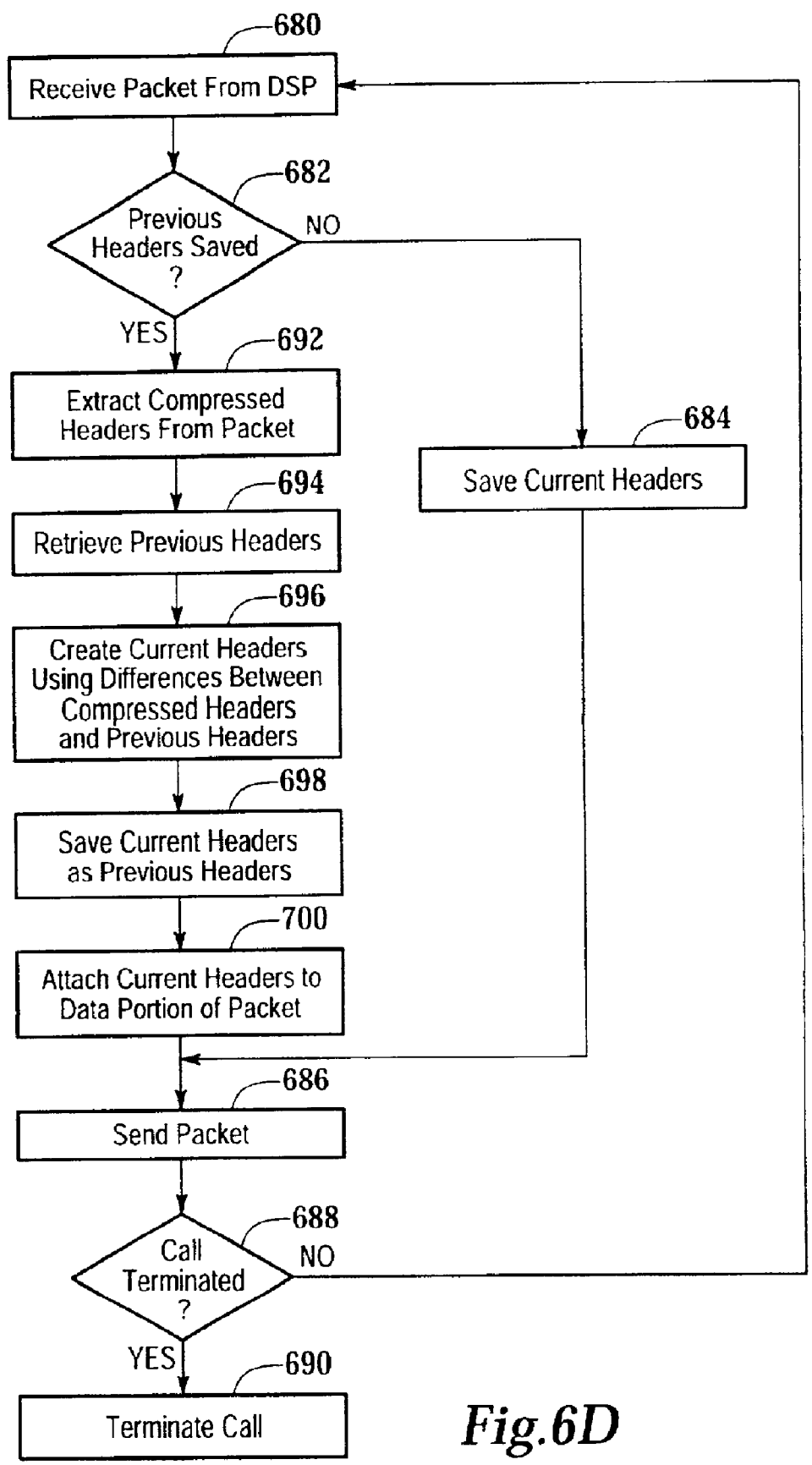
FIG. 6D is a flowchart of a header decompression method in accordance with one embodiment of the present invention.

Referring now to FIG. 6D, a flowchart depicting an embodiment of the decompression process used by the egress cards 610a, 610b (FIG. 6A) that corresponds to the compression process described in FIG. 6C is shown. A packet is received from one of the DSPs 606a, 606b, 606c . . . 606n (FIG. 6A) via the switch fabric 608 (FIG. 6A) in block 680. Whenever one or more previous headers have not been saved, as determined in decision block 682, the one or more current headers are saved as the one or more previous headers in block 684 and the packet is sent out over the IP network in block 686. If, however, the one or more previous headers have been saved, as determined in decision block 682, the one or more compressed headers are extracted from the packet in block 692 and the one or more previous headers are retrieved in block 694. The one or more current headers are created using one or more differences between the one or more compressed headers and the one or more previous headers in block 696, and the one or more current headers are saved as the one or more previous headers in block 698. The one or more current headers are attached to the data portion of the packet in block 700 and the packet is sent out over the IP network in block 686. After the packet has been sent in block 686, if the call is terminated, as determined in decision block 688, the call is terminated in block 690. If, however, the call is not terminated, as determined in decision block 688, the process loops back to block 680 where the next packet is received.

Figure 7A:
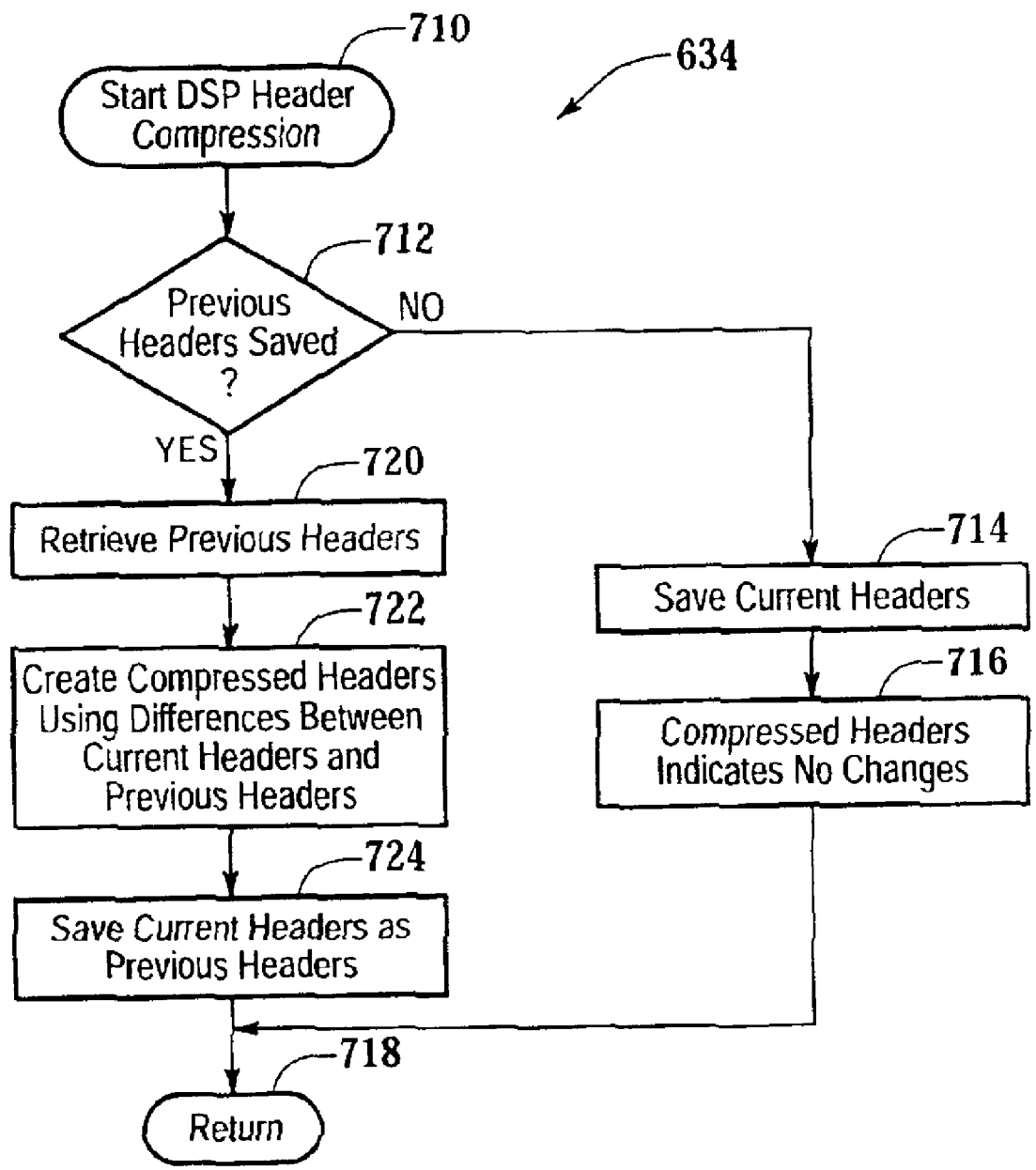
FIG. 7A is a flowchart of a header compression method in accordance with another embodiment of the present invention.

Now referring to FIG. 7A, a flowchart depicting another embodiment of the compression process of block 634 is shown. The DSP header compression process 634 begins in block 710. Whenever one or more previous headers have not been saved, as determined in decision block 712, the one or more current headers are saved as the one or more previous headers in block 714, the one or more compressed headers are created to indicate not changes in block 716 and the process returns in block 718. If, however, the one or more previous headers have been saved, as determined in decision block 712, the one or more previous headers are retrieved in block 720, the one or more compressed headers are created using one or more differences between the one or more current headers and the one or more previous headers in block 722, the one or more current headers are saved as the one or more previous headers in block 724 and the process returns in block 718.

Figure 7B:
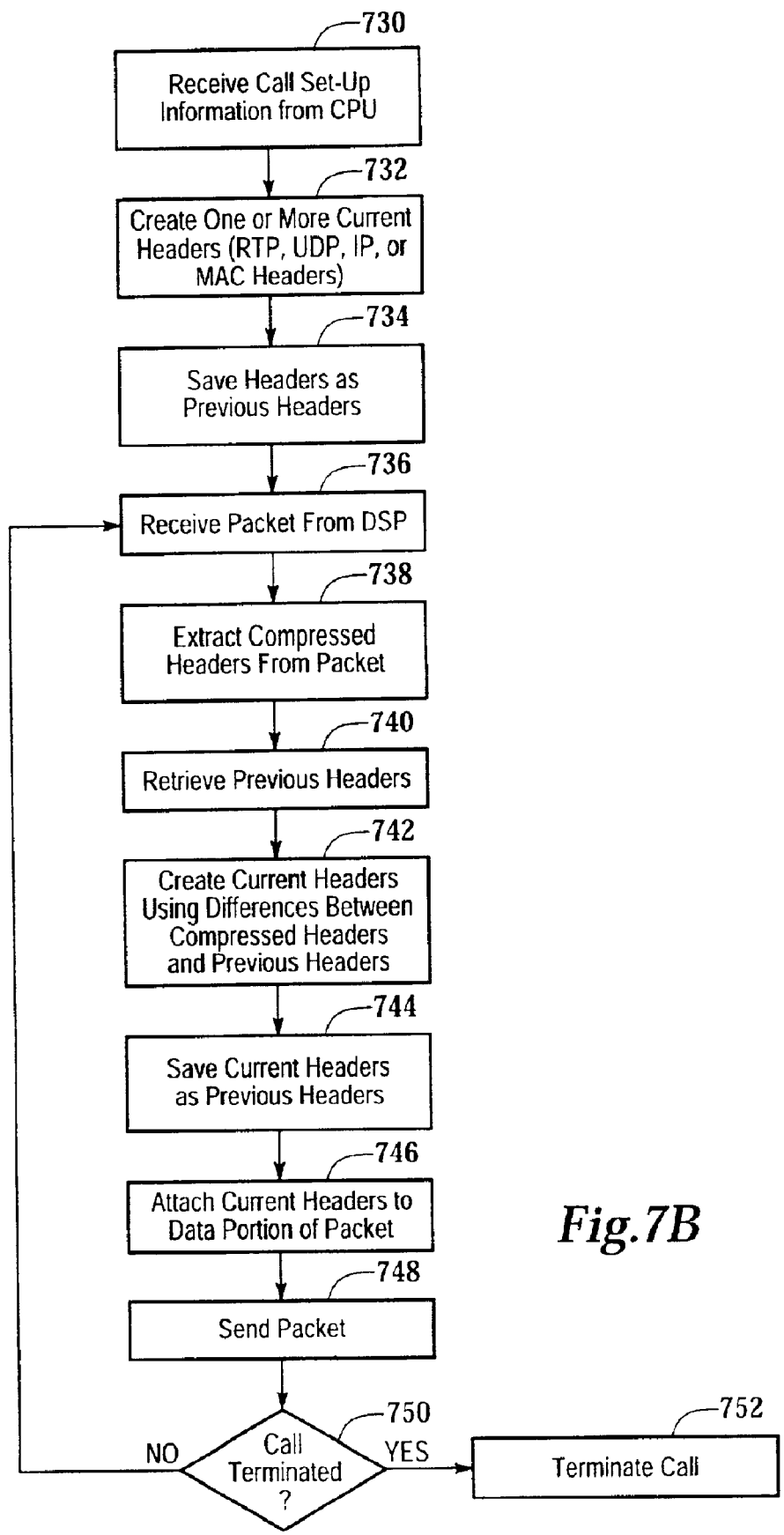
FIG. 7B is a flowchart of a header decompression method in accordance with another embodiment of the present invention.

Referring now to FIG. 7B, a flowchart depicting another embodiment of the decompression process used by the egress cards 610a, 610b (FIG. 6A) that corresponds to the compression process described in FIG. 7A is shown. The egress cards 610a, 610b (FIG. 6A) receives call set-up information from the CPU 612 (FIG. 6A) in block 730. The egress cards 610a, 610b (FIG. 6A) creates one or more current headers, such as a RTP header, a UDP header, an IP header and a MAC header, using the call data and the call set-up information in block 732. More specifically, the RTP and UDP headers are generated from the call data while the IP and MAC headers are generated from the call set-up information. Note that the egress cards 610a, 610b (FIG. 6A) is not limited to the creation of any specific headers, such as a RTP header, a UDP header, an IP header or a MAC header, but can be used to create any header necessary for proper delivery of a packet. The one or more current headers are stored as one or more previous headers in block 734.

A packet is received from one of the DSPs 606a, 606b, 606c . . . 606n (FIG. 6A) via the switch fabric 608 (FIG. 6A) in block 736. The one or more compressed headers are extracted from the packet in block 738 and the one or more previous headers are retrieved in block 740. The one or more current headers are created using one or more differences between the one or more compressed headers and the one or more previous headers in block 742, and the one or more current headers are saved as the one or more previous headers in block 744. The one or more current headers are attached to the data portion of the packet in block 746 and the packet is sent out over the IP network in block 748. After the packet has been sent in block 748, if the call is terminated, as determined in decision block 750, the call is terminated in block 752. If, however, the call is not terminated, as determined in decision block 750, the process loops back to block 736 where the next packet is received.

Those skilled in the art will appreciate that the present invention is applicable not only to the compression/decompression of packet headers in the ingress to egress direction, but also to the compression/decompression of packet headers in the egress to ingress direction. Moreover, the embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of creating a packet having one or more compressed headers, the method comprising the steps of:

receiving call set-up information;

receiving call data;

creating a data portion of the packet using the call data;

creating one or more current headers using the cell data and the call set-up information;

compressing the one or more current headers, further comprising the steps of whenever one or more previous headers are not found, saving the one or more current headers as the one or more previous headers and usings the one or more current headers as one or more compressed headers; and whenever the one or more previous headers are found, creating the one or more compressed headers using one or more differences between the one or more current headers and the one or more previous headers and saving the one or more current headers as the one or more previous headers; and creating the packet by attaching the one or more compressed headers to the data portion of the packet.

2. The method as recited in claim 1, further comprising the step of transmitting the packet to a switch fabric.

3. The method as recited in claim 1, wherein the one or more headers comprise a real time transport protocol header.

4. The method ma recited in claim 3, wherein the real time transport protocol header is determined by the call data.

5. The method as recited in claim 1, wherein the one or more headers comprise a user datagram protocol header.

6. The method as recited in claim 5, wherein the user datagram protocol header is determined by the call data.

7. The method as recited in claim 1, wherein the one or more headers comprise an internet protocol header.

8. The method as recited in claim 7, wherein the internet protocol header is created from the call set-up information.

9. A method of creating a packet having one or more compressed headers, the method comprising the steps of:
receiving call set-up information;
receiving call data;
creating a data portion of the packet using the call data;
creating one or more current headers using the call data and the call set-up information;
compressing the one or more current headers, further comprising the steps of
whenever one or more previous headers have not been saved, saving the one or more current headers as the one or more previous headers end creating one or more compressed headers to indicate no changes; and
whenever the one or more previous headers have been saved, creating the one or more compressed headers using one or more differences between the one or more current headers and the one or more previous headers and saving the one or more current headers as the one or more previous headers; and
creating the packet by attaching the one or more compressed headers to the data portion of the packet.

10. A method of creating a packet having one or more compressed headers, the method comprising the steps of:
receiving cell set-up information;
receiving call data;
creating a data portion of the packet using the call data;
creating one or more current headers using the call data and the call set-up information;
compressing the one or more current headers; and
creating the packet by attaching the one or more compressed headers to the data portion of the packet, wherein the one or more headers comprise a media access control header and wherein the media access control header is created from the call set-up information.

11. A method of creating a packet having one or more compressed headers, the method comprising the steps of:
receiving call set-up information;
receiving call data;
creating a data portion of the packet using the call data, further comprising the steps of
compressing the call data;
creating one or more digital samples from the compressed call data; and
creating the data portion of the packet using the one or more digital samples;
creating one or more current headers using the call data and the call set-up information;
compressing the one or more current headers; and
creating the packet by attaching the one or more compressed headers to the data portion of the packet.

12. A method of creating a packet having one or more compressed headers, the method comprising the steps of;
receiving call set-up information;
receiving call data;
creating a data portion of the packet using the call data;
creating one or more current headers using the call data and the call set-up information;
compressing the one or more current headers;
creating the packet by attaching the one or more compressed headers to the data portion of the packet;
requesting an overlay based on the call set-up information; and
receiving and loading the overlay.

13. An apparatus comprising:
an array of digital signal processors;
each digital signal processor programmed to receive call set-up information, receive call data, create a data portion of a packet using the call data, create one or more current headers using the call data and the call set-up information, compress the one or more current headers and create the packet by attaching the one or more compressed headers to the data portion of the packet wherein each digital signal processor compresses the one or more current headers by;
whenever one or more previous headers have not been saved, saving the one or more current headers as the one or more previous headers and using the one or more current headers as one or more compressed headers; and
whenever the one or more previous headers have been saved, creating the one or more compressed headers using one or more differences between the one or more current headers and the one or more previous headers and saving the one or more current headers as the one or more previous headers.

14. The apparatus as recited in claim 13, wherein the one or more headers comprise a real time transport protocol header.

15. The apparatus as recited in claim 14, wherein the real time transport protocol header is determined by the call data.

16. The apparatus as recited in claim 13, wherein the one or more headers comprise a user datagram protocol header.

17. The apparatus as recited in claim 16, wherein the user datagram protocol header is determined by the call data.

18. The apparatus as recited in claim 13, wherein the one or more headers comprise an internet protocol header.

19. The apparatus as recited in claim 18, wherein the internet protocol header is created from the call set-up information.

20. An apparatus comprising:
an array of digital signal processors;
each digital signal processor programmed to receive call set-up information, receive call data, create a data portion of a packet using the call data, create one or more current headers using the call data and the call set-up information, compress the one or more current headers and create the packet by attaching the one or more compressed headers to the data portion of the packet, wherein each digital signal processor compresses the one or more current headers by:
whenever one or more previous headers have not been saved, saving the one or more current headers as the one or more previous headers and creating one or more compressed headers to indicate no changes; and
whenever the one or more previous headers have been saved, creating the one or more compressed headers using one or more differences between the one or more current headers and the one or more previous headers and saving the one or more current headers as the one or more previous headers.

21. An apparatus comprising:

an array of digital signal processors;

each digital signal processor programmed to receive call set-up information, receive call data, create a data portion of a packet using the call data, create one or more current headers using the cell data and the call set-up information, compress the one or more current headers and create the packet by attaching the one or more compressed headers to the data portion of the packet, wherein the one or more headers comprise a media access control header wherein the media access control header is created from the call set-up information.

22. An apparatus comprising:

an array of digital signal processors;

each digital signal processor programmed to receive call set-up information, receive call data, create a data portion of a packet using the call data, create one or more current headers using the call data and the call set-up information, compress the one or more current headers and create the packet by attaching the one or more compressed headers to the data portion of the packet, wherein each digital signal processor creates a data portion of the packet using the call data by compressing the call data, creating one or more digital samples from the compressed call data, and creating the data portion of the packet using the one or more digital samples.

23. An apparatus comprising:

an array of digital signal processors;

each digital signal processor programmed to receive call set-up information, receive call data, create a data portion of a packet using the call data, create one or more current headers using the call data and the call set-up information, compress the one or more current headers and create the packet by attaching the one or more compressed headers to the data portion of the packet, wherein each digital signal processor is further programmed to request an overlay based on the call set-up information, and receive and load the overlay.

* * * * *

UNITED STATES PATENT AND TRADEMARK OFFICE
CERTIFICATE OF CORRECTION

PATENT NO. : 6,954,460 B2 Page 1 of 1
APPLICATION NO. : 09/972270
DATED : October 11, 2005
INVENTOR(S) : Alan DeMars It is certified that error appears in the above-identified patent and that said Letters Patent is hereby corrected as shown below:

In Column 10, Line 47, in Claim 1, delete "cell" and insert -- call --, therefor.

In Column 10, Line 53, in Claim 1, delete "usings" and insert -- using --, therefor.

In Column 11, Line 1, in Claim 4, delete "ma" and insert -- as --, therefor.

In Column 11, Line 23, in Claim 9, delete "end" and insert -- and --, therefor.

In Column 11, Line 36, in Claim 10, delete "cell" and insert -- call --, therefor.

In Column 13, Line 10, in Claim 21, delete "cell" and insert -- call --, therefor.

Signed and Sealed this

Twentieth Day of November, 2007

JON W. DUDAS
*Director of the United States Patent and Trademark Office*